TIME-DEPENDENT PRIORITY SYSTEM

Filed Jan. 18, 1965 5 Sheets-Sheet 1

INVENTOR.
GEORGE T. SHIMABUKURO
BY
Christie, Parker & Hale
ATTORNEYS.

INVENTOR.
GEORGE T. SHIMABUKURO
BY
Christie, Parker & Hale
ATTORNEYS.

INVENTOR.
GEORGE T. SHIMABUKURO
BY
Christie, Parker & Hale
ATTORNEYS.

INVENTOR.
GEORGE T. SHIMABUKURO
BY
Christie, Parker & Hale
ATTORNEYS.

United States Patent Office 3,333,252
Patented July 25, 1967

3,333,252

TIME-DEPENDENT PRIORITY SYSTEM

George T. Shimabukuro, Monterey Park, Calif., assignor to Burroughs Corporation, Detroit, Mich., a corporation of Michigan Filed Jan. 18, 1965, Ser. No. 426,058
10 Claims. (Cl. 340—172.5)

This invention relates to digital data processors and, more particularly, to a system whereby the performance of various operations by a processor is controlled by time-dependent priorities assigned to the operations.

In every type of data processing or control system there is a need for some sort of priority system. In many cases, input/output operations are controlled by priority in order to keep all such auxiliary units operating at full speed. In certain processors, there is need for a system that will cause the operation of specific programs before others. As data processors become more and more complex, the need for an adequate priority system becomes more and more acute.

Hardware priority systems have been built which provide one level of priority only. In such a system one operation will ordinarily have a high priority while all others will have identical low priorities. In such a system, regardless of how long a low priority operation has been ready, it will not be reached as long as the high priority operation does not release the system.

Another approach to the handling of priority has been to program the priority. Programming methods are able to provide various levels of priorities but require memory cycles and program steps in which the processor itself must be used to determine the priorities.

Additionally, priorities assigned at the start of a program may have to be changed while the program is being operated on. Assume that if a particular operation is not performed for some time the priority of that operation increases. Thus, for example, the priority of a punched card output is ordinarily not as important as a magnetic tape output. However, if the card output operation is delayed for a long period of time, it may become necessary to increase the importance of this operation. At some point, the card output operation will become more important than that of the tape and a modification of priority to assure that card output will occur within a certain period of time would be very advantageous.

It is one advantage of the present invention that it provides a means for modifying the priority assigned to a particular operation in order to assure the performance of that operation within a certain period of time.

Another advantage of the present invention is that it provides multiple levels of priority without being program dependent.

Yet another advantage of the present invention is that original priorities assigned to each of a plurality of programs or input/output operations may be caused to increase in a time-dependent fashion.

A further advantage of the present invention is that the priority of a particular operation may be made to increase only after associated circuitry indicates that the particular operation is ready to be performed.

The preceding and other advantages of the present invention are achieved by means of assigning each program or input/output operation to a word in an associative type memory. A group of bits in the word is used to address the location in the main memory of the particular program or input/output operation. Another group of bits is indicative of an original priority valve assigned to the particular program or operation, while a third group will be indicative of its priority at any given time. Additionally, the word will contain a ready bit which is set by associated circuitry to indicate when the particular program or operation is ready to be performed.

An associative register counter is used to count from the highest to the lowest priority and as the count progresses to compare the count with the present priority of each of the words whose ready bit has been set. If there is a comparison, that word will be transferred to the register, the particular operation will be performed and the word will be transferred back into the memory. When the processor is again ready to perform one of the operations associated with the words, the register counter will again count from the highest to the lowest priority and make comparisons as the count progresses.

A word which is ready for operation is assured of eventual comparison with the register counter by means of a counting down operation by which the present priority of each word ready for operation is counted down at fixed intervals. In this manner, it is assured that all programs associated with words of the memory will be operated on at least once during a fixed interval of time. After a word has been transferred to the register counter and its associated operation performed, its "present priority" bits are returned to the value of the operation's original priority before the word is retransferred into the memory.

The manner of operation of the present invention and the manner in which it achieves the above and other advantages may be more clearly understood by reference to the following detailed description when considered with the drawing, in which.

Figure 1:
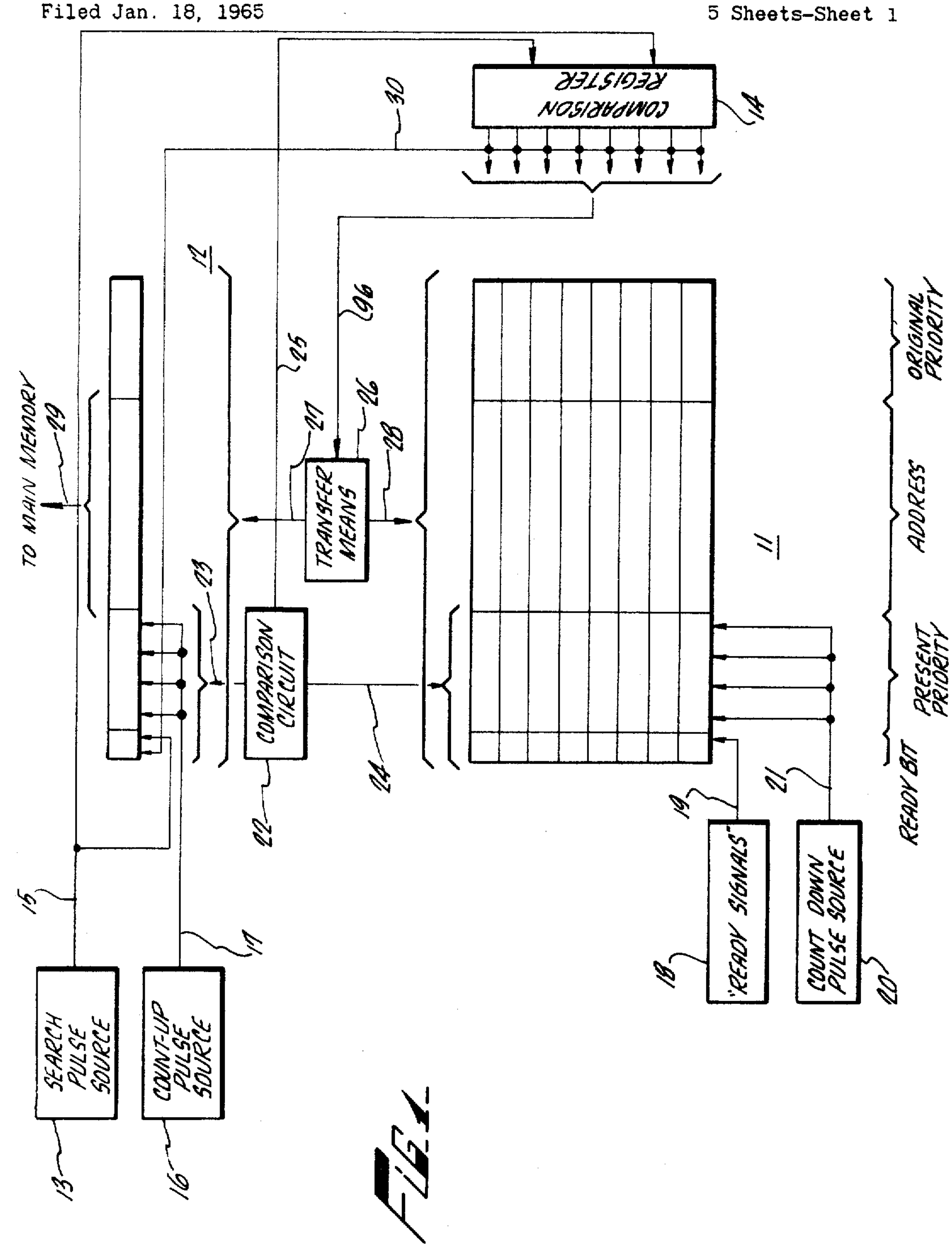
FIG. 1 depicts in block diagram form a preferred embodiment of a time-dependent priority system according to the present invention.

FIG. 1 shows a general block diagram of a time-dependent priority system according to the present invention. It depicts memory 11 which may conveniently be made up of a plurality of flip-flop circuits. The memory 11 contains a plurality of word addresses each of which is associated with a particular program or input/output operation. Each of these memory word addresses contains a plurality of bit addresses and is divided into several sections.

As shown in FIG. 1 each word address contains a first bit address in which a ready bit may be stored, a second group of bit addresses in which the "present priority" of the particular program or input/output operation may be stored, a third group of bit addresses which may be used to address a location in the main memory of the data processor for a particular program or input/output operation, and a fourth group of bit addresses in which the original priority of the particular program or input/output operation is stored. The number of bits in each of the latter three sections of the word address will depend upon the number of priority levels and the size of the addressing words.

FIG. 1 also shows register 12 which also may advantageously be made up of flip-flop circuits. As shown, register 12 may store a single word of the size of those words stored in memory 11. Register 12 is also depicted as divided into ready bit, present priority, address, and original priority sections. Search pulse source 13 is shown to be connected to the "ready bit" address of register 12 and to comparison register 14 by lead 15. Count-up pulse source 16 is shown to be connected to the "present priority" bit addresses of register 12 by lead 17. A source of ready signals 18 is shown to be connected to the ready bit addresses of the word addresses in memory 11 by lead 19. Count-down pulse source 20 is shown to be connected to the "present priority" addresses of the word addresses in memory 11 by lead 21.

Comparison circuit 22 is shown to be connected between the "ready bit" and "present priority" addresses of register 12 and the similar addresses of memory 11 by leads 23 and 24, respectively. Lead 25 is shown connecting comparison circuit 22 and comparison register 14. Transfer means 26 is shown connected between the entire register 12 and each word address of memory 11 by leads 27 and 28, respectively, and connected to register 14 by lead 96. The address section of register 12 is indicated by lead 29 to be connected to the main memory of a data processor associated with the priority system shown in FIG. 1. Lead 30 is shown connecting comparison register 14 and the "ready bit" address of register 12.

The operation of the time-dependent priority system shown in FIG. 1 will now be described. Each word address of memory 11 is associated with a particular operation to be performed by the associated data processor. The addresses within the main memory of the processor corresponding to these operations are stored in the "address" sections of respective ones of the world addresses of memory 11. Each of these operations will have an original priority assigned thereto and this original priority will be stored in the "original priority" section of respective ones of the word addresses. Initially each word address will have stored in its "present priority" section the same value stored in its "original priority" section.

Whenever associated circuitry indicates that a particular one of these operations is ready to be performed, a signal will be supplied from the source of "ready" signals 18 via lead 19 to the "ready bit" address of the word address associated with the particular operation ready to be performed. This signal will set the "ready bit" flip-flop circuit of that word address to its ON condition. Count-down pulse source 20 applies signals at periodic intervals via lead 21 to the "present priority" flip-flop circuits of the word addresses of memory 11. As described hereinafter, these pulses increase the priority stored in the "present priority" section of those word addresses whose "ready bit" flip-flops have been turned on. The interval between successive pulses from source 20 is made dependent upon how frequently it is desired to increase the present priorities of these word addresses. The shorter this interval of time, the faster the priorities will change and consequently the sooner the critical point will be reached.

It is assumed throughout that a high priority is indicated by a low value stored in the "present priority" addresses while a low priority is indicated by a larger value stored in these addresses. Consequently, pulse source 20 is denoted a count-down pulse source because it decreases the values stored in the "present priority" addresses and thereby increases the present priority of any word address whose associated operation is ready to be performed.

Whenever associated circuitry indicates that the data processor is ready to perform one of the operations stored in memory 11, a signal will be applied from source 13 via lead 15 to the "ready bit" address of register 12, thereby turning on the "ready bit" flip-flop circuit. The signal from source 13 is also effective to clear comparison register 14. Subsequent to the "ready bit" flip-flop of register 12 being turned on, successive signals from pulse source 16 via lead 17 are effective to increase the value stored in the "present priority" section of register 12. If the value initially stored in this section is assumed to be "0," the values stored therein by successive signals will thereafter go from a high priority indication to successively lower priority indications. The counting-up of these "present priority" addresses is discussed in more detail hereinafter.

As the "present priority" addresses of register 12 are being counted up, the value stored therein is constantly being compared to the values stored in the "present priority" addresses of all of the word addresses in memory 11 whose "ready bit" flip-flop is in the ON condition. Upon finding a comparison between the values stored in the "present priority" addresses of register 12 and in the similar addresses of one of these word addresses of memory 11, a signal is transmitted from comparison circuit 22 via lead 25 to comparison register 14. This comparison operation is described in detail hereinafter.

Also upon the comparison circuit 22 finding a comparison between the "present priority" values stored in register 12 and in one of the word addresses of memory 11, transfer means 26 will be effective to transfer the compared word from memory 11 to register 12. A signal applied to transfer means 26 from comparison register 14 via lead 96 indicates to transfer means 26 the particular word to be transferred. Upon this word being stored in register 12, lead 29 will indicate to the main memory of the data processor the particular address in the main memory of the chosen program or input/output operation. While the chosen word is in register 12, transfer means 26 is also effective to replace the value stored in the "present priority" section with the value stored in the "original priority" section. Also at this time an output signal from comparison register 14 via lead 30 is effective to turn off the "ready bit" flip-flop circuit in register 12. Upon completion by the data processor of the operation so selected, transfer means 26 is effective to restore the word presently stored in register 12 to its original location within memory 11 and to clear register 12. In this manner, the highest priority operation has been chosen by the system shown in FIG. 1 and transmitted to the data processor for performance thereof.

As indicated previously, pulse source 20 continues to apply periodic signals to the "present priority" addresses of those word addresses whose "ready bit" flip-flops are in the ON condition and "ready" signal pulse source 18 continues to apply signals via lead 19 to turn on the "ready bit" flip-flops of the remaining word addresses as soon as their associated operations are again ready to be performed. Upon retransfer of the word address associated with the operation just performed from register 12 back to memory 11, the "ready bit" flip-flop of this particular word address will be in the OFF condition. However, as soon as this particular operation is again ready to be performed, its "ready bit" flip-flop circuit will be again turned on and its "present priority" flip-flops will again be receptive to signals from count-down source 20.

When the data processor is ready to perform a second one of the operations associated with the word addresses of memory 11, a second signal from source 13 will be applied via lead 15 to turn on the "ready bit" flip-flop of register 12. The values stored in the "present priority" flip-flops of register 12 will again be counted up by pulses from pulse source 16 and comparisons will again be made by means of comparison circuit 22. Selection of the next operation to be performed will be carried out in a manner identical to the selection of the first operation as just described. As will be indicated in detail hereinafter, whenever comparison circuit 22 finds more than one word address in memory 11 whose "present priority" value is equal to that in register 12, it will select only a particular one of these word addresses.

The source of ready signals 18 is shown in FIG. 1 in block diagram form. This source may comprise any well-known circuitry capable of providing signals to respective ones of the "ready bit" flip-flops of the word addresses of memory 11 whenever the operations associated with these word addresses are again ready to be performed.

Similarly, search pulse source 13 may comprise any well-known circuitry capable of providing a signal to the "ready bit" flip-flop of register 12 whenever the data processor is ready to perform one of the operations associated with the word addresses of memory 11.

The source of count-down pulses 20 is also shown in block diagram form and may comprise any well-known circuitry capable of providing signals at fixed intervals. The interval between pulses is chosen in accordance with the desired rate of increase in "present priority" of operations ready to be performed. Similarly, the source of count-up pulses 16 is also shown in block diagram form and may comprise any well-known circuitry capable of providing signals at fixed intervals. The interval between count-up pulses will advantageously be such that the "present priority" value stored in register 12 will be increased from the highest priority value to the lowest priority value in use in the system during a signal interval between pulses from source 20.

Transfer means 26 shown in block diagram form may comprise any well-known means for transferring a selected word from memory 11 to register 12, inserting the original priority value of this word into its "present priority" section and subsequently restoring the word to its original word address in memory 11. Transfer means 26 may, for example, comprise well-known gating circuitry. The particular word to be so transferred is indicated to transfer means 26 by a signal from comparison register 14 shown in FIG. 1, for purposes of illustrative clarity, as being transmitted via lead 96. The operation of comparison register 14 is described in detail hereinafter.

Figure 2:
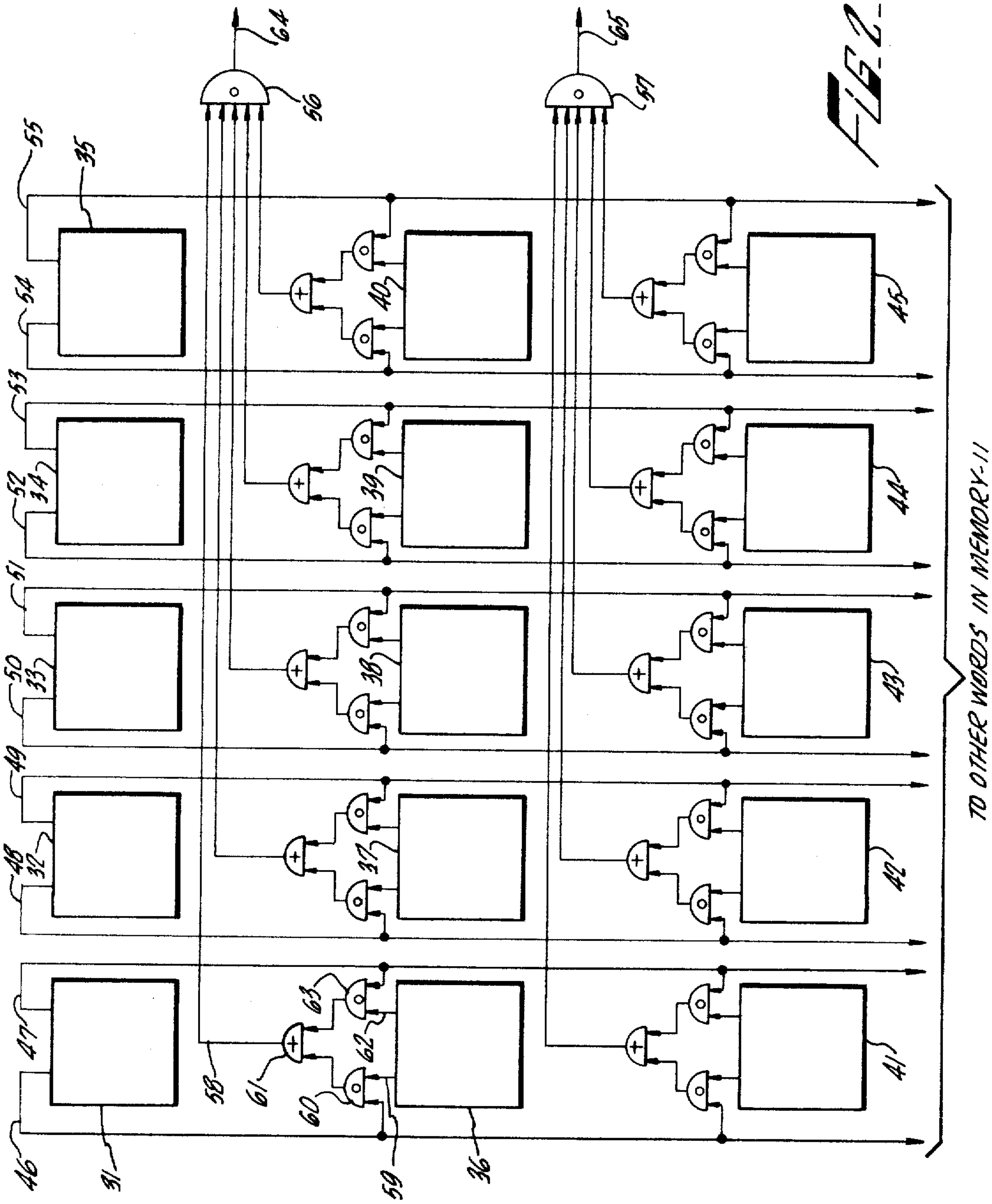
FIG. 2 depicts in detail the operation of comparison circuit 22 of FIG. 1.

FIG. 2 depicts in detail the operation of comparison circuit 22 of FIG. 1. It shows "ready bit" flip-flop 31 of register 12 and flip-flops 32, 33, 34, and 35 which represent the "present priority" flip-flops of register 12. It also depicts "ready bit" flip-flops 36 and 41 associated with two of the word addresses of memory 11 and flip-flops 37–40 and 42–45, representative, respectively, of the "present priority" flip-flops of these two word addresses. Leads 46 and 47 are connected to flip-flop circuit 31, lead 46 having a signal applied thereto when this flip-flop circuit is in its OFF condition and lead 47 having a signal applied thereto when it is in its ON condition. Similarly, leads 48, 50, 52, and 54 have signals applied thereto when their respective flip-flop circuits 32, 33, 34, and 35 are in the OFF condition, and leads 49, 51, 53, and 55 have signals applied thereto when their respective flip-flop circuits 32, 33, 34, and 35 are in the ON condition. Output signals or the absence thereof on leads 46–55 are compared with signals or the absence thereof on similar output leads connected to each of the flip-flop circuits 36–45. This comparison is further effected by means of two AND gates and one OR gate between output leads from each of the flip-flops 31–35 and one flip-flop from each of the word addresses in memory 11. Thus, FIG. 2 depicts the connections between output leads from each of the flip-flops 31–35 and output leads from flip-flops of two of the word addresses. Identical connections exist between the output leads of flip-flops 31–35 and those of the remaining word addresses.

Whenever one of the flip-flop circuits 31–35 is found to be in the same condition as the corresponding flip-flop circuit of one of the word addresses, a signal is applied to an input terminal of one of the gates 56 and 57. Thus, in looking only at the connections between flip-flops 31 and 36, it may be seen that a signal will be passed to gate 56 via lead 58 only when flip-flops 31 and 36 are in identical conditions. If both of these flip-flops are in the OFF condition, signals will be applied to lead 46 connected to flip-flop 31 and to lead 59 connected to flip-flop 36. These signals will simultaneously be applied to gate 60 and thereafter passed by OR gate 61 to lead 58. Similarly, if both flip-flops 31 and 36 are in the ON condition, signals will be applied to lead 47 of flip-flop 31 and to lead 62 from flip-flop 36 simultaneously to AND gate 63 and thereafter passed via OR gate 61 to lead 58.

In a similar manner, signals will be applied to the four other input terminals of gate 56 only if pairs of flip-flops 32 and 37, 33 and 38, 34 and 39, and 35 and 40 are in identical conditions. Should this situation arise, these identical conditions indicate that a comparson has been effected between the "present prority" stored in register 12 as indicated by the conditions of flip-flops 32–35, and the "present priority" of one of the word addresses of memory 11 as indicated by the conditions of flip-flops 37–40. Upon such comparison, a signal is passed via AND gate 56 to lead 64. Similarly, if flip-flops 42–45 were to store the same present priority value as that stored in flip-flops 32–35, simultaneous signals would be applied to the inputs of gate 57 and a signal would be passed to lead 65. Comparisons between the present priority value stored in register 12 and that stored in word addresses not shown in FIG. 2 would be made in an identical manner. For purpoes of illustrative clarity, leads 64 and 65 and other similar leads associated with word addresses not shown in FIG. 2 were depicted in FIG. 1 by single lead 25.

Figure 3:
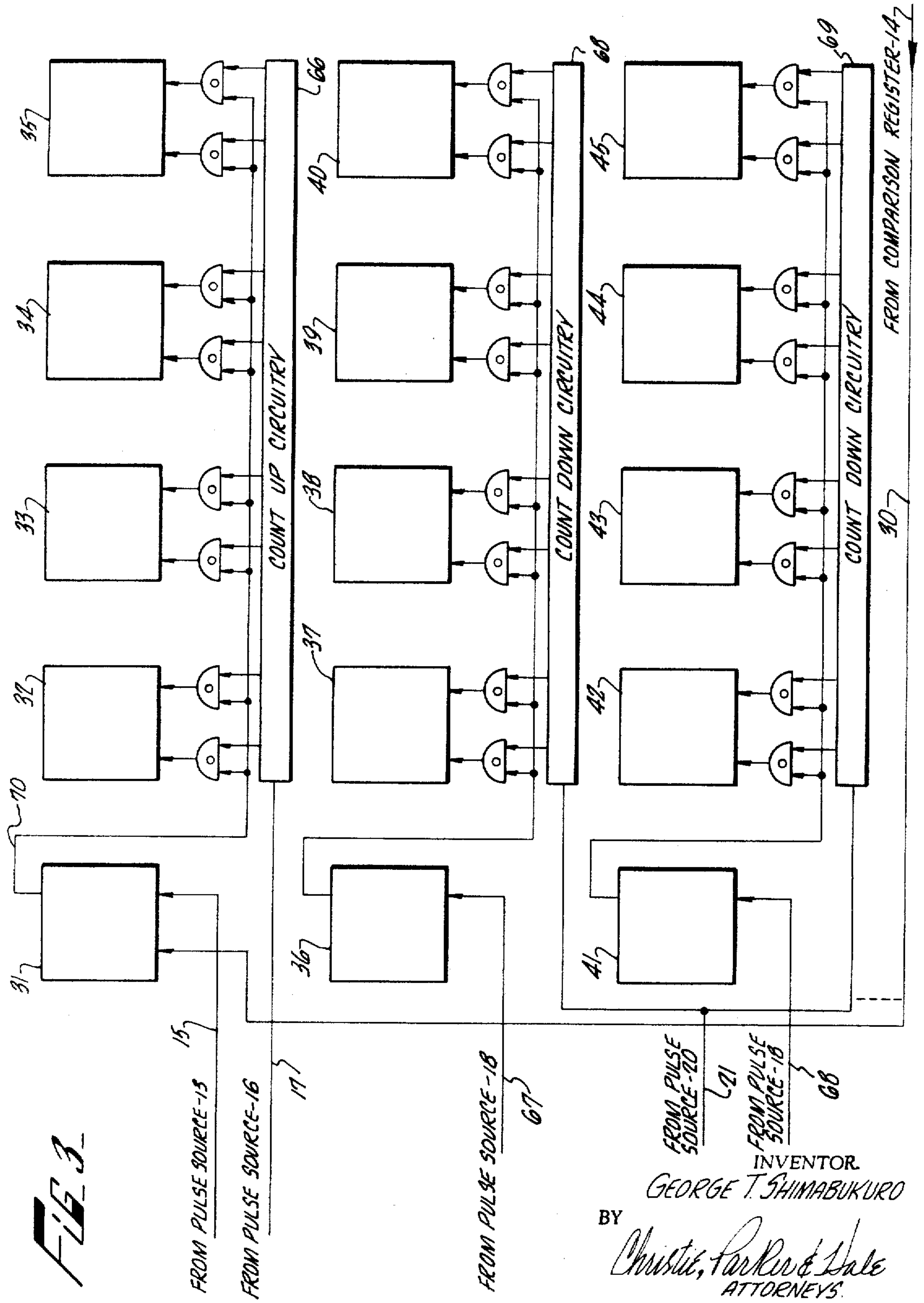
FIG. 3 depicts in detail the counting arrangement by which the register counter 12 and words in memory 11 of FIG. 1 are respectively counted up and down.

FIG. 3 depicts in detail the counting arrangement by which the "present priority" values in register 12 and in the word addresses of memory 11 are respectively counted up and down. FIG. 3 also shows the flip-fiop circuits 31–45 shown in FIG. 2.

Signals from pulse source 13 via lead 45 are effective to turn flip-flop 31 on. Signals from comparison register 14 via lead 30 are effective to turn flip-flop circuit 31 off. Signals from pulse source 16 via lead 17 are shown here as being applied to count-up circuitry 66. Signals from pulse source 20 via lead 21 are shown as being applied to count-down circuitry 68 and 69.

"Ready" signals from source 18 are here shown to be applied via leads 67 and 68 to turn ON flip-flops 36 and 41, respectively. These signals were shown in FIG. 1 as being applied to a single lead 19 merely for illustrative convenience. It is apparent, since the operations associated with word addresses in memory 11 will be ready for performance at different times, that different signals from source 18 must be applied to the ready bit flip-flops of these word addresses. Similarly, the signals applied to leads 17 and 21 were shown in FIG. 1 as being applied directly to the present priority flip-flops merely for the sake of convenience.

Signals from count-up circuitry 66 and from output lead 70 of flip-flop 31 are connected to input terminals of each of flip-flops 32–35 through two AND gates. The signals passed by one AND gate of each of these flip-flops is effective to turn that flip-flop on while the signal passed by the other AND gate is effective to turn it off. A signal will be applied to lead 70 only when flip-flop 31 is in the ON condition and no signals will be passed to any of the flip-flops 32–35 unless a signal is applied to lead 70. The count-up circuitry 66 is shown in block diagram form and may comprise well-known binary counting logic circuitry. Thus, it is seen that circuitry 66 is effective to increase the value stored in the "present priority" flip-flops 32–35 of register 12 upon each application of count-up pulses from source 16 to circuitry 66 only if there has been an indication that the data processor is ready to perform one of the operations stored in memory 11. This indication is manifested by means of a signal from source 13 effective to turn on flip-flop 31. Thus, no counting up of the present priority addresses on register 12 will be effected unless flip-flop 31 is in its ON condition. Similarly, no counting down of the "present priority" value stored in flip-flops 37–40 or in flip-flops 42–45 may be effected unless their associated ready bit flip-flops 36 and 41, respectively, are in the ON condition. Count-down circuitry 68 and 69 are also shown in block diagram form and may comprise well-known binary logic counting circuits. These circuits decrease the value stored in their associated "present priority" addresses upon the application of count-down pulses from source 20 only when their associated "ready bit" flip-flop is in the ON condition. The "ready bit" flip-flop 36 is turned on by a signal from source 18 applied to lead 67 and "ready bit" flip-flop 41 is turned on by a signal applied from source 18 via lead 68.

Figure 4:
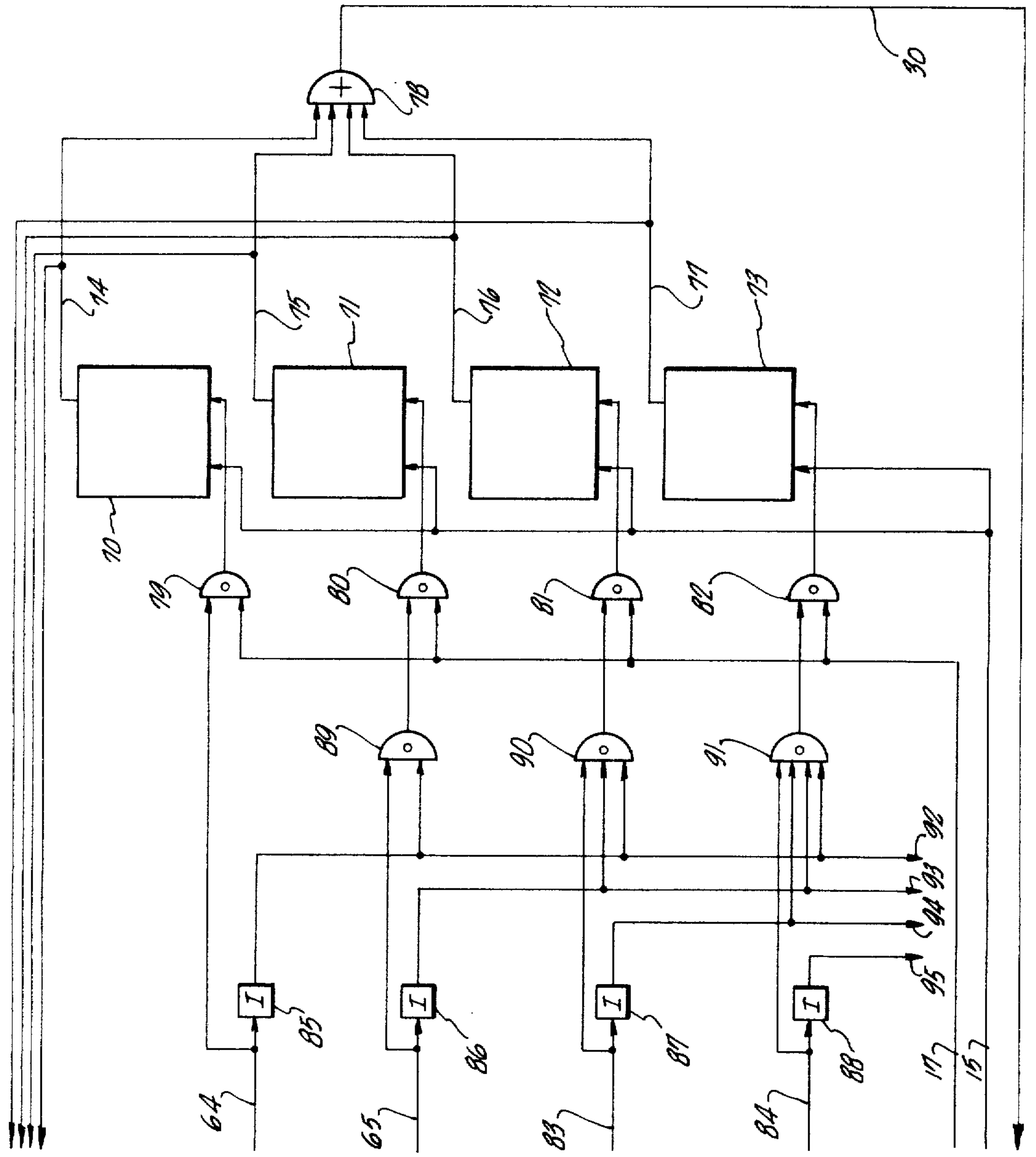
FIG. 4 depicts in detail the operation of comparison register 14 of FIG. 1 and of circuitry associated therewith.

FIG. 4 depicts in detail the operation of comparison register 14 shown in FIG. 1. This register is also made up of flip-flop circuits, four of which, 70, 71, 72, and 73, each associated with one of the word addresses of memory 11, are shown in FIG. 4.

The output leads 74, 75, 76, and 77, connected to flip-flops 70–73, respectively, apply signals to OR gate 78 and to transfer means 26 whenever their respective flip-flop circuits are in the ON condition. For illustrative clarity, these leads were depicted in FIG. 1 by single lead 96. Consequently, whenever one of these flip-flops is in the ON condition, OR gate 78 will pass a signal to lead 30 which, as shown in FIGS. 1 and 3, is effective to turn off flip-flop circuit 31. The flip-flop circuits 70–73 are turned to their OFF condition by a signal applied to lead 15 from pulse source 13. AND gates 79, 80, 81, and 82, associated with flip-flops 70–73, respectively, are effective to turn on these flip-flops in response to simultaneous signals applied to them from pulse source 60 via lead 17 and from leads 64, 65, 83, and 84, respectively. Leads 64 and 65 are also shown in FIG. 2 as being output leads from gates 56 and 57 associated with two of the word addresses of memory 11. Leads 83 and 84 may similarly represent leads from two other of the word addresses of memory 11. Signals will be applied to these leads when comparison circuit 22 determines that there is an identity between the "present priority" stored in register 12 and that stored in one of the word addresses thereby selecting that address. Thus, gate 79 will pass a signal effective to turn on flip-flop 70 when simultaneous signals appear on leads 64 and 17. When one of the flip-flops 70–73 is turned on, it transmits a signal to transfer means 26 via the respective one of leads 74–77 indicative of the particular word address selected.

As mentioned previously, if it should happen that more than one word address in memory 11 has the same present priority stored therein as does register 12, only one of these word addresses will be selected and its operation performed by the data processor. Inverters 85, 86, 87, and 88 and gates 89, 90, and 91 insure that only one of the word addresses of memory 11 will be thus selected. The inverters 85–88 are shown in block diagram form and represent well-known logic elements which pass a signal when no signal is applied to their input terminal but do not transmit a signal when a signal is applied to their input terminal. Thus, if a signal appears on lead 64, no signal will be transmitted by inverter 85. Consequently, none of the gates 89, 90, and 91 will be able to transmit a signal and consequently none of the flip-flops 71, 72, and 73 may be turned on. Similary, the signal applied to lead 65 prevents gates 90 and 91 from passing a signal and their associated flip-flops 72 and 73 from being turned on. Similarly, a signal applied to lead 83 will prevent gate 91 from passing a signal and its associated flip-flop circuit 73 from being turned on.

As will be recalled, a signal from pulse source 13, shown in FIG. 1, indicates that the data processor is ready to perform one of the operations stored in memory 11. A signal from this pulse source, as shown in FIG. 4, turns off all of the flip-flops 70–73. A subsequent comparison effectuated by circuit 23 between the present priority stored in register 12 and in one or more of the word addresses in memory 11 will, as shown in FIGS. 2 and 4, effectuate signals on one or more of the leads 64, 65, 83, and 84. Signals will be effected on the ones of these leads associated with word addresses successfully compared by comparison circuit 22. Each word address will have associated therewith an output lead which is connected to an inverter associated with one flip-flop of comparison register 14. There will be as many such leads as there are word addresses although only four such are shown in FIG. 4 for purposes of illustrative convenience. Arrows 92, 93, 94, and 95 indicate connections to be made from inverters 85–88 to similar circuitry associated with other word addresses of memory 11 according to the pattern indicated in FIG. 4. Thus, upon comparison circuit 22 finding equality between the present priority value stored in register 12 and that stored in one or more of the word addresses of memory 11, only one of the flip-flops of comparison register 14 will be set to its ON condition. That one flip-flop circuit will be the one associated with a single word address so selected. In the subsequent transferring of the selected word from memory 11 to register 12, the particular one of the flip-flop circuits 70–73 in the ON condition indicates to transfer means 26 which word is to be transferred. The particular word to be transferred is indicated by a signal transmitted to transfer means 26 via one of the leads 74–77.

Figure 5:
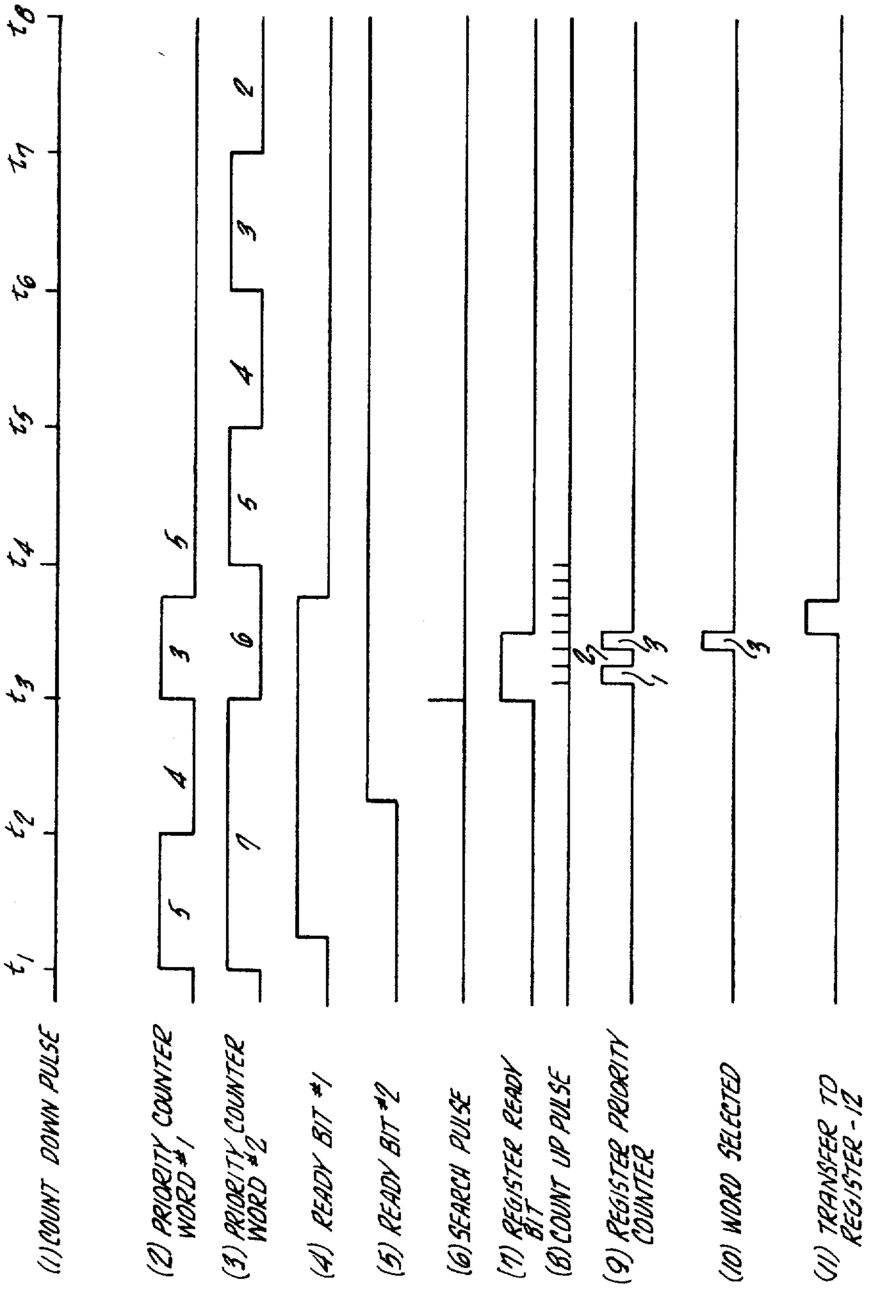
FIG. 5 depicts a timing diagram which indicates signals associated with various elements of the system shown in FIG. 1 during an exemplary operation of the system.

Finally, FIG. 5 depicts a timing diagram indicating various signals associated wth elements of the system shown in FIG. 1 during one exemplary operation of the system. This figure shows eight pulses from count-down pulse source 20 which appear at the times $t_1$ through $t_8$. Two particular words 1 and 2 are assumed to have original priorities of "5" and "7," respectively, and exhibit these priorities at time $t_1$. The "ready bit" flip-flop of word 1 is shown to be turned on between times $t_1$ and $t_2$. consequently, word 1 is counted down to priority "4" at time $t_2$ and to priority "3" at time $t_3$. The "ready bit" of word 2 is shown to be turned on between times $t_2$ and $t_3$. Consequently, the priority of this word is reduced to "6" at time $t_3$, to "5" at time $t_4$, to "4" at time $t_5$, to "3" at time $t_6$, and to "2" at time $t_7$. A search pulse from source 13 is shown to occur at time $t_3$. Consequently, the "ready bit" flip-flop of register 12 is also shown to be turned on at time $t_3$. Count-up pulses from source 16 are therefore effective to begin counting up the priority stored in register 12 immediately subsequent to time $t_3$ and, as indicated further in FIG. 5, this priority will be increased to "3" at a time between $t_3$ and $t_4$. Since at this time word 1 also has a present priority of "3," comparison circuit 22 will select this word to be transferred to register 12 and the operation associated with this word will be performed. Subsequent to the transfer of this word to register 12, its present priority will be changed to "5," its original priority, and returned to memory 11. Thus, during the remaining time periods indicated in FIG. 5, the present priority of word 1 will remain "5". At period $t_8$ the priority of word 2 will be reduced to "1" and will remain 1 thereafter until a subsequent search pulse indicates that the data processor is again ready to perform another of the operations stored in memory 11. At such time, word 2 will be immediately selected unless another word address is also storing a present priority of 1 at that time and associated circuitry such as that shown in FIG. 4 indicates that the latter word is to be preferred over word 2 when both have the same present priority.

What has been described is considered to be only an illustrative embodiment of the present invention, and, accordingly, it is to be understood that various and numerous other arrangements may be devised by one skilled in the art without departing from the spirit and scope of this invention.

What is claimed is:

1. A priority system for indicating to a data processor the order in which particular operations are to be performed comprising:

a memory having a plurality of addresses for the storage of binary informtaion therein, each address of the memory having associated therewith a particular operation of the data processor, each particular operating being manifested by a particular combination of bits stored in its associated address,
means for assigning original priority values to each of the particular operations,
means for indicating which of the particular operations are ready to be performed,
means for periodically increasing the present priority value of each operation indicated by the indicating means to be ready for performance, and
means for periodically indicating to the processor the particular operation then manifesting the highest priority.

2. A priority system for indicating to a data processor the order in which particular operations are to be performed comprising:
a memory having a plurality of addresses for the storage of binary digital words therein,
each word address comprising a plurality of bit addresses and having a particular operation of the data processor associated therewith, the particular operation being manifested by a particular combination of bits stored in a first section of the address,
each operation having an original priority assigned thereto, bits representative of the original priority being stored in a second section of each address,
bits representative of the original priority also being initially stored in a third section of each address,
means for storing a ready bit in a fourth section of each address, the ready bit indicating that the operation associated with the address in which it is stored is ready to be performed by the processor,
means for periodically increasing the priority value stored in the third section of each address in which a ready bit is stored,
a register having a single word address of four sections identical to those of the memory word addresses,
means for storing a ready bit in the fourth section of the register word address, the ready bit indicating that the processor is ready to perform one of the operations associated with the memory word addresses,
means for sequentially changing the value stored in the third section of the register word address from the highest original priority value assigned to any of the memory word addresses to the lowest original priority value assigned to any of the memory word addresses,
means for comparing the value stored in the third section of the register word address with the values stored in the third section of all memory word addresses in which a ready bit is stored,
means responsive to the determination of equality between the compared values stored in the register word address and one of the memory word addresses for transferring the memory word there stored to the register,
means responsive to storage of a memory word in the register to indicate to the processor the particular operation associated with that memory word,
means also responsive to the determination of equality for removing the ready bit from the fourth section of the register word address, and
means for storing the original priority value stored in its second address into the third address of the register word address and for transferring the entire memory word stored in the register word address to its poper memory word address.

3. A priority system according to claim 2 further comprising:
means responsive to the determination of equality between the compared values stored in the register word address and in several of the memory word addresses for selecting a memory word stored in one of these addresses as the word to be transferred by the transferring means to the register.

4. A priority system comprising:
a memory having a plurality of addresses for the storage of binary digital words therein,
each word address comprising a plurality of bit addresses and having a particular information value stored in a first section of the address,
each particular information value having an original priority assigned thereto, bits representative of each information value's original priority being stored in a second section of its address,
bits representative of an information value's original priority also being initially stored in a third section of its address,
means for storing a ready bit in a fourth section of each address, the ready bit indicating that the particular information value associated with that address is ready for selection,
means for periodically increasing the priority value stored in the third section of each address in which a ready bit is stored, and
means for periodically selecting that particular information value which at the time of selection has a ready bit stored in the fourth section of its address and the highest priority value stored in the third section of its address.

5. A priority system according to claim 4 in which the selecting means comprises:
a register having a single word address identical to the word addresses of the memeory,
means for sequentially changing a value stored in one section of the register word address from the highest original priority value assigned to any of the information values to the lowest original priority value assigned to any of the information values,
means for comparing the priority value stored in the register word address with the values stored in the third section of all memory word addresses in which a ready bit is stored, and
means responsive to the determination of equality between the compared values stored in the register word address and one of the memory word addresses for transferring the information value there stored to the register word address.

6. A priority system according to claim 5 further comprising:
means responsive to the determination of equality between the compared values stored in the register word address and in several of the memory word addresses for selecting a memory word stored in one of these addresses as the word to be transferred by the transferring means to the register.

7. A priority system according to claim 6 in which:
the value stored in one section of the register word address is sequentially increased from "1" to "$n$," "1" being the highest priority value and "$n$" being the lowest original priority value assigned to any of the information values.

8. A priority system according to claim 7 in which the value stored in the third section of each address in which a ready bit is stored is sequentially decreased from its original value until it reaches the value "1" and thereafter remains "1," "1" representing the highest priority value.

9. A priority system comprising:
a memory having a plurality of addresses for the storage of binary digital words therein,
each word address comprising a plurality of bit addresses and having a particular information value stored in a first section of the address,
each particular information value having an original priority assigned thereto, bits representative of each information value's original priority being stored in a second section of its address,
means for indicating when a particular information value is ready for selection, means for periodically increasing the priority value stored in the second section of those addresses whose associated information value is ready for selection, and means for periodically selecting the particular information value ready for selection which at the time of selection has the highest priority value stored in the second section of its address.

10. A priority system according to claim 9 in which:

the means for indicating when a particular information value is ready for selection comprises means for storing a ready bit in a third section of the word address associated with the particular information value.

References Cited

UNITED STATES PATENTS

| | | | |
|---|---|---|---|
| 3,048,332 | 8/1962 | Brooks et al. | 235—157 |
| 3,181,123 | 4/1965 | Wright et al. | 340—172.5 |
| 3,221,309 | 11/1965 | Benghiat | 340—172.5 |
| 3,222,647 | 12/1965 | Strachey | 340—172.5 |
| 3,222,649 | 12/1965 | King et al. | 340—172.5 |
| 3,286,236 | 11/1966 | Logan et al. | 340—172.5 |
| 3,286,239 | 11/1966 | Thompson et al. | 340—172.5 |
| 3,290,658 | 12/1966 | Callahan et al. | 340—172.5 |

ROBERT C. BAILEY, *Primary Examiner.*

O. E. TODD, *Assistant Examiner.*